United States Patent
Lo et al.

(10) Patent No.: US 12,254,634 B2
(45) Date of Patent: Mar. 18, 2025

(54) PANORAMIC VIDEO CONFERENCE SYSTEM AND METHOD

(71) Applicant: AmTRAN Technology Co., Ltd., New Taipei (TW)

(72) Inventors: Kuo Chih Lo, New Taipei (TW); Chih Hao Lin, New Taipei (TW)

(73) Assignee: AmTRAN Technology Co., Ltd., New Taipei (TW)

(*) Notice: Subject to any disclaimer, the term of this patent is extended or adjusted under 35 U.S.C. 154(b) by 340 days.

(21) Appl. No.: 17/658,653

(22) Filed: Apr. 10, 2022

(65) Prior Publication Data

US 2023/0215011 A1 Jul. 6, 2023

(30) Foreign Application Priority Data

Dec. 30, 2021 (TW) .................................. 110149736

(51) Int. Cl.
| | |
|---|---|
| *G06T 7/12* | (2017.01) |
| *G06T 7/194* | (2017.01) |
| *G06T 7/90* | (2017.01) |
| *G06T 11/40* | (2006.01) |
| *G06V 10/25* | (2022.01) |
| *G10L 25/78* | (2013.01) |
| *H04R 3/00* | (2006.01) |

(52) U.S. Cl.
CPC ................ *G06T 7/12* (2017.01); *G06T 7/194* (2017.01); *G06T 7/90* (2017.01); *G06T 11/40* (2013.01); *G06V 10/25* (2022.01); *G10L 25/78* (2013.01); *H04R 3/005* (2013.01)

(58) Field of Classification Search
CPC .. G06T 7/12; G06T 7/194; G06T 7/90; G06T 11/40; G06V 10/25; G06L 25/78; H04R 3/005

See application file for complete search history.

(56) References Cited

U.S. PATENT DOCUMENTS

| | | | |
|---|---|---|---|
| 2017/0019633 A1* | 1/2017 | Shaburov | G06V 40/161 |
| 2019/0373210 A1* | 12/2019 | Nguyen | G06V 20/59 |
| 2021/0082131 A1* | 3/2021 | Schnittman | G06V 40/166 |

FOREIGN PATENT DOCUMENTS

| | | |
|---|---|---|
| CN | 108447105 A | 8/2018 |
| CN | 111918018 A | 11/2020 |
| TW | 201901527 A | 1/2019 |

* cited by examiner

*Primary Examiner* — John R Wallace
(74) *Attorney, Agent, or Firm* — CKC & Partners Co., LLC

(57) ABSTRACT

A panoramic video conference system and method are provided. The panoramic video conference system includes a panoramic video generating apparatus and a control apparatus. The control apparatus analyzes a panoramic video to identify a plurality of video objects in the panoramic video. The control apparatus selects a video object to be removed from the video objects based on a privacy mode. The control apparatus removes a video corresponding to the video object. The control apparatus generates a panoramic conference video based on the panoramic video and a background filling video.

16 Claims, 4 Drawing Sheets

PANORAMIC VIDEO CONFERENCE SYSTEM AND METHOD

CROSS-REFERENCE TO RELATED APPLICATION

This application claims priority to Taiwan Application Serial Number 110149736, filed Dec. 30, 2021, which is herein incorporated by reference in its entirety.

BACKGROUND

Field of Invention

The present invention relates to a panoramic video conference system and method. More particularly, the present invention relates to a panoramic video conference system and method that provide a plurality of functions.

Description of Related Art

In recent years, many modes and services different from general video conferences have been developed in the market due to the increasing demands for remote work and online conferences, and one of them is a panoramic video conference that can provide simultaneous video conferences for many members.

However, compared with the video of the general video conferences, multi-members conferences using the panoramic video usually need to face more technical problems, such as the presentation and fluency of the panoramic video in the conference. In addition, due to the wide range of shooting angles of the panoramic video, sensitive objects or participants unrelated to the conference may be photographed when using the panoramic video, which may cause concerns about the privacy of the enterprise.

Accordingly, there is an urgent need for a panoramic video conference technology that can take into account privacy rights and provide a plurality of functions in a panoramic video conference to improve the service quality of the panoramic video conference.

SUMMARY

An objective of the present disclosure is to provide a panoramic video conference system. The panoramic video conference system comprises a panoramic video generating apparatus and a control apparatus. The control apparatus is connected to the panoramic video generating apparatus. The panoramic video generating apparatus is configured to generate a panoramic video. The control apparatus analyzes the panoramic video to identify a plurality of video objects in the panoramic video. The control apparatus selects a video object to be removed from the video objects based on a privacy mode. The control apparatus removes a video corresponding to the video object. The control apparatus generates a panoramic conference video based on the panoramic video and a background filling video.

Another objective of the present disclosure is to provide a panoramic video conference method, which is adapted for use in a panoramic video conference system. The panoramic video conference system comprises a panoramic video generating apparatus and a control apparatus. The panoramic video conference method is performed by the control apparatus and comprises following steps: analyzing a panoramic video received from the panoramic video generating apparatus to identify a plurality of video objects in the panoramic video; selecting a video object to be removed from the video objects based on a privacy mode; removing a video corresponding to the video object; and generating a panoramic conference video based on the panoramic video and a background filling video.

According to the above descriptions, the panoramic video conference technology (at least includes the system and the method) provided by the present disclosure identify a plurality of video objects in the panoramic video by analyzing the panoramic video. In addition, the panoramic video conference technology provided by the present disclosure can select a to-be-removed video object from the video objects to remove from the panoramic video based on a privacy mode. Finally, the panoramic video conference technology provided by the present disclosure generates a panoramic conference video based on the panoramic video and a background filling video. The panoramic video conference technology provided by the present disclosure can selectively hide some video objects through the above-mentioned mechanism, so as to provide enterprises with more flexible privacy requirements. In addition, the panoramic video conference technology provided by the present disclosure provides a plurality of functions, and improves the service and quality of the online conference.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a panoramic video conference system and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
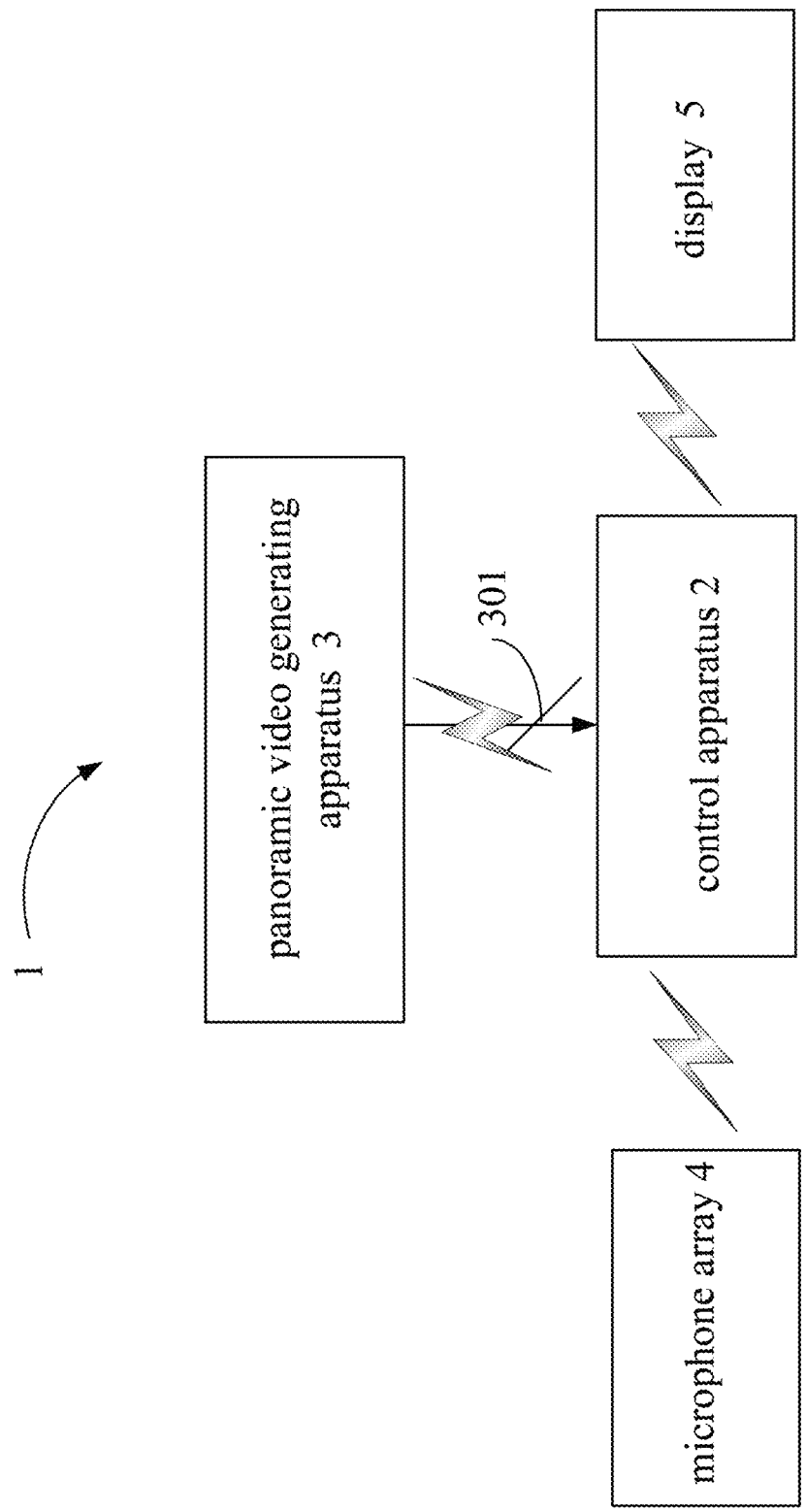
FIG. 1 is a schematic view depicting a panoramic video conference system of the first embodiment.

First, the application scenario of the present embodiment will be explained, and a schematic view is depicted in FIG. 1. As shown in FIG. 1, the panoramic video conference system 1 at least comprises a panoramic video generating apparatus 3 and a control apparatus 2. In this scenario, the control apparatus 2 may be connected to the panoramic video generating apparatus 3 through a wired or wireless ways (e.g., a wireless communication network). The panoramic video generating apparatus 3 is used to continuously (e.g., 30 frames per second) generate the panoramic video 301 corresponding to the conference. For example, the panoramic video generating apparatus 3 can be installed on a table in a conference room and generates the video comprising all participants in the conference.

In some embodiments, the panoramic video conference system 1 further comprises a microphone array 4 and a display 5. The microphone array 4 and the display 5 can be connected to the control apparatus 2 by wired or wireless ways (e.g., wireless communication network).

It shall be appreciated that the panoramic video generating apparatus 3 is used to generate a 360-degree panoramic video 301. The panoramic video generating apparatus 3 may include at least two cameras, and the panoramic video 301 may include a plurality of images (i.e., multiple frames). For example, the panoramic video generating apparatus 3 may be composed of three cameras with a field of view (FOV) of 120 degrees, so the video of the cameras can be combined to generate a 360-degree surrounded panoramic video 301.

In the present disclosure, the panoramic video conference system 1 is a local side conference system, the panoramic video conference system 1 is connected with other remote conference systems (not shown). The panoramic video conference system 1 transmits the panoramic conference video to the remote conference system for online conference. The following paragraphs will focus on various functions of the local side conference system (i.e., the panoramic video conference system 1). Those of ordinary skill in the art shall appreciate the implementation details of the connection between different conference systems. Therefore, the details will not be repeated herein.

In the present disclosure, in order to improve the quality of the online conference, the panoramic video conference system 1 mainly provides at least three types of functions, which are the privacy object hiding function, the speech source focusing function and the loop playback function. The following paragraphs will describe the details related to the present disclosure.

Figure 2:
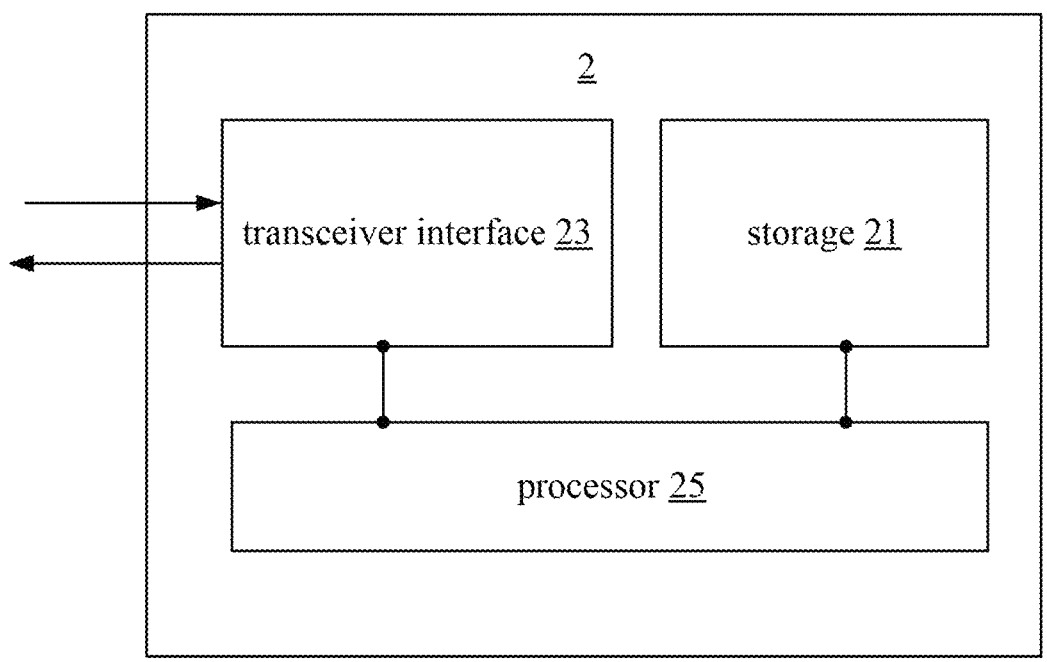
FIG. 2 is a schematic view depicting a control apparatus of the first embodiment.

The schematic view of the structure of the control apparatus 2 in the first embodiment of the present disclosure is depicted in FIG. 2. The control apparatus 2 comprises a storage 21, a transceiver interface 23 and a processor 25. The processor 25 is electrically connected to the storage 21 and the transceiver interface 23. The storage 21 may be a memory, a Universal Serial Bus (USB) disk, a hard disk, a Compact Disk (CD), a mobile disk, or any other storage medium or circuit known to those of ordinary skill in the art and having the same functionality. The transceiver interface 23 is an interface capable of receiving and transmitting data or other interfaces capable of receiving and transmitting data and known to those of ordinary skill in the art. The transceiver interface 23 can receive data from sources such as external apparatuses, external web pages, external applications, and so on. The processor 25 may be any of various processors, Central Processing Units (CPUs), microprocessors, digital signal processors or other computing apparatuses known to those of ordinary skill in the art.

Next, the operations of the first embodiment of the present disclosure will be described below. Please refer to FIG. 1 and FIG. 2. The first embodiment of the present disclosure relates to the privacy object hiding function provided by the panoramic video conference system 1. It shall be appreciated that during the conference, some meeting participants, sensitive objects, and sundries in the conference room need to be hidden based on privacy rights or conference requirements. Therefore, in the present embodiment, the control apparatus 2 may identify objects shown in the panoramic video 301 and removes some of the objects from the panoramic video 301 (e.g., making the objects transparent).

Specifically, the control apparatus 2 analyzes the panoramic video 301 to identify a plurality of video objects in the panoramic video 301. When the user selects a privacy mode through the control apparatus 2, the control apparatus 2 may select a video object to be removed (i.e., to-be-removed video object) from the video objects accordingly. In some embodiments, the control apparatus 2 may also select a plurality of video objects to be removed from the video objects.

It shall be appreciated that the privacy mode may include a list of candidates of video objects to be removed, the list indicates video objects that need to be hidden. For example, the list can be selected from a plurality of preset templates, or generated by the user's dynamic selection after the control apparatus 2 identifies a plurality of video objects in the panoramic video 301 (e.g., manually checking conference participants and sensitive objects that need to be hidden).

In some embodiments, the control apparatus 2 further provides with an video identification model, and the control apparatus 2 identifies the video objects in the panoramic video 301 based on an edge detection algorithm and the video identification model. For example, the control apparatus 2 performs edge detection on the panoramic video 301 by using an edge detection algorithm to find out the objects in the video (i.e., the panoramic video 301). Then, through the video identification model, the control apparatus 2 classifies the video data in this area and performs the feature comparison to identify the position data and identity data of objects and people in the video.

It shall be appreciated that the video identification model can be used to identify the video objects in the panoramic video 301, and the video identification model can be implemented by a training process based on a plurality of object features and a plurality of conference member features through training of a neural network architecture. Those of ordinary skill in the art shall appreciate the corresponding operations based on above descriptions. Therefore, the details will not be repeated herein.

Next, in the present embodiment, the control apparatus 2 removes an video corresponding to the video object. Finally, the control apparatus 2 generates a panoramic conference video based on the panoramic video and a background filling video.

In some embodiments, the control apparatus 2 first calculates a plurality of color feature values of a plurality of adjacent blocks of the video object to be removed, and then the control apparatus 2 generates the background filling video based on the color feature values. For example, the control apparatus 2 can separate the foreground object and the background through a nearest neighbor algorithm (e.g., a k-nearest neighbors (KNN) algorithm), calculate the color feature value distributions of the removed blank area, and generate a background filling video to fill the blank area. In some embodiments, the control apparatus 2 may also perform a second area filling on the blank area based on a Sub-patch Texture Synthesis Algorithm, so as to make the fused video more natural.

Figure 3A:
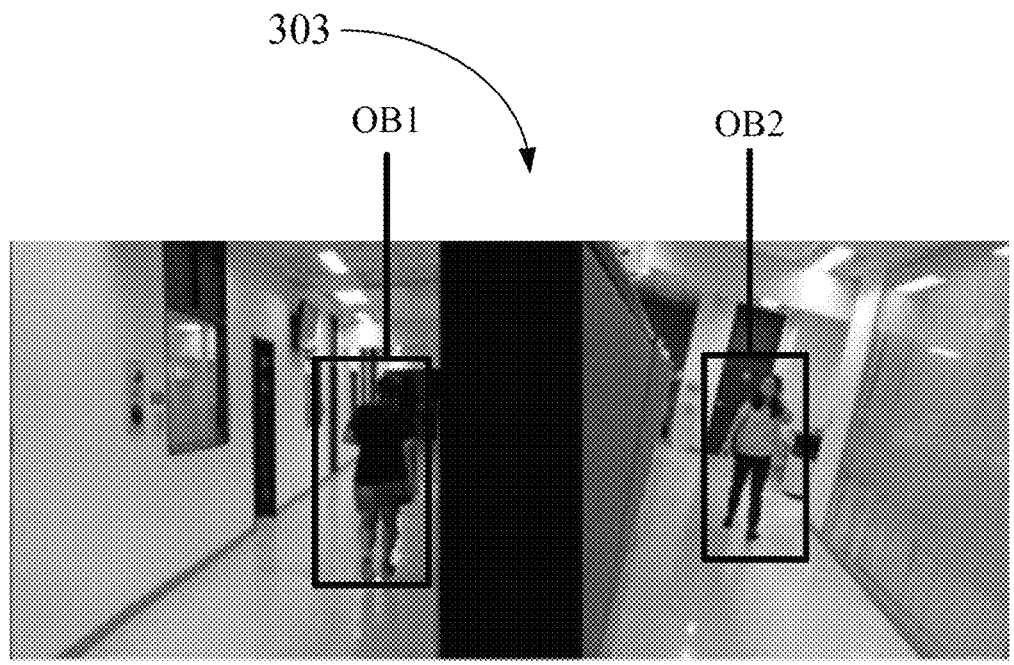
FIG. 3A is a schematic view depicting an video with a plurality of object features of the first embodiment.
Figure 3B:
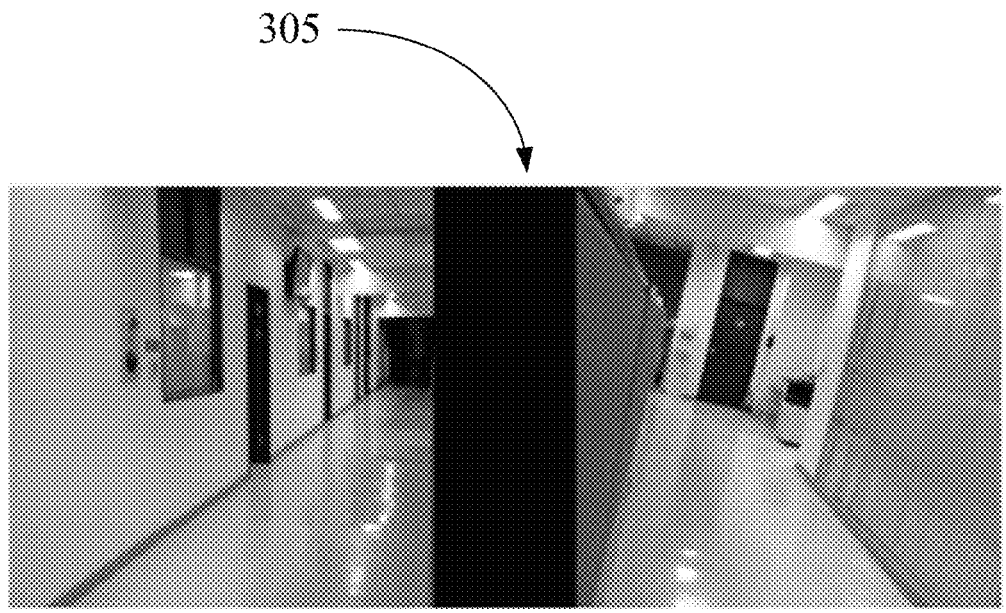
FIG. 3B is a schematic view depicting an video of removing the video object of the first embodiment.

For ease of understanding, taking an actual example as an example, please refer to FIG. 3A and FIG. 3B at the same time. FIG. 3A illustrates an video 303 with a plurality of object features. After the control apparatus 2 analyzes the video 303, the control apparatus 2 identifies that the video 303 comprises the video object OB1 and the video object OB2. In the present example, the video object OB1 and the video object OB2 are both the video objects to be removed, the control apparatus 2 removes the video of the video object OB1 and the video object OB2 in the video 303 (i.e., the area framed by the video object object OB1 and the video object OB2). As shown in FIG. 3B, the control apparatus 2 generates the video 305 through the background filling video generated by the aforementioned method.

It shall be appreciated that, for the convenience of illustration, the video 303 and the video 305 are only one of the frames in the video. In the actual operations, the control apparatus 2 continuously and dynamically determines one or more frames in the video (e.g., based on 10 frames at the same time), and the operations can be adjusted according to the actual operation requirements of the control apparatus 2. Those of ordinary skill in the art shall appreciate the implementation for multiple frames based on the above descriptions. Therefore, the details will not be repeated herein.

Next, the speech source focusing function provided by the panoramic video conference system 1 of the present disclosure will be described. During a conference, when a conference participant speaks, the panoramic video conference system 1 can focus the video on the speaker to improve the quality of the conference (e.g., generate a video focusing on the speaker).

Specifically, the panoramic video conference system 1 further comprises a microphone array 4. The microphone array is connected to to the control apparatus 2 through a network connection. The microphone array 4 is configured to sense a sound of a conference room to generate a sound signal. The control apparatus 2 first receives the sound signal from the microphone array 4. Next, the control apparatus 2 determines a speaking source (e.g., the speaker in the conference) based on the sound signal.

Subsequently, the control apparatus 2 compares a plurality of conference member features with the panoramic video corresponding to the speech source to determine whether the panoramic video corresponding to the speech source has a first conference member feature that matches the conference member features. The control apparatus 2 generats a focusing video corresponding to the speech source when it is determined that the panoramic video corresponding to the speech source has the first conference member feature. Finally, the control apparatus 2 generates the panoramic conference video based on the focusing video and the panoramic video (e.g., generates an upper divided video and a lower divided video, the upper divided video is the panoramic video, and the lower divided video is the focusing video).

For example, the control apparatus 2 may determine the source of the speech based on a direction of arrival (DOA) and beamforming technologies (i.e., a direction of arrival algorithm and a beamforming algorithm). It shall be appreciated that the control apparatus 2 determines whether the speech source is indeed made by the person participating in the conference by comparing whether the speech source matches one of the conference member features. Therefore, the operations can avoid misjudgment caused by noise in the environment or irrelevant actions, and improve the quality of the conference.

In addition, when the conference is in progress, the conference room is usually provided with a display for playing the remote video and sound. In order to avoid the situation that the focusing video is focused on the display due to the remote conference sound played on the display.

Therefore, in some embodiments, the control apparatus 2 may limit the use of the "the speech source focusing function" to avoid misjudgment (i.e., the sound emitted by the display 5 must be actively excluded). Specifically, the panoramic video conference system 1 further comprises a display 5, and the display 5 is configured to play a remote conference video and a remote conference sound. The control apparatus 2 generates an exclusion area based on a position of the display 5. The control apparatus 2 compares the speech source with the exclusion area to determine whether the speech source comes from the exclusion area, and the focusing video corresponding to the speech source is not generated when the speech source comes from the exclusion area.

It shall be appreciated that the control apparatus 2 can confirm the position of the display 5 through the aforementioned object identification. In addition, in some embodiments, when the position of the display 5 moves, the control apparatus 2 can also dynamically adjust the exclusion area to avoid the misjudgment.

Next, the loop playback function provided by the panoramic video conference system 1 of the present disclosure will be described. The following paragraphs will describe the details related to the present disclosure. Before the conference starts or after the conference ends, the panoramic video conference system 1 can generate a close-up video of the person participating in the conference when the video detects the presence of the person participating in the conference, and plays the loop video to introduce the current attendees in the conference (e.g., the loop playback mode).

Specifically, the panoramic video generating apparatus 3 of the the panoramic video conference system 1 may further comprise a first camera and a second camera, the first camera is configured to generate a first video, the second camera is configured to generate a second video, and the panoramic video 301 is composed of the first video and the second video.

In the present embodiment, the control apparatus 2 can detect whether a first conference member with a first conference member feature appears in the first video, and generate a close-up video of the first conference member as the first video when the first conference member with the first conference member feature appears in the first video.

Furthermore, the control apparatus 2 can detect whether a second conference member with a second conference member feature appears in the first video, and generate a close-up video of the second conference member as the second video when the second conference member with the second conference member feature appears in the second video.

Therefore, before the conference starts or after the conference ends, the panoramic video conference system 1 can play the panoramic video 301 composed of the first video and the second video in a loop. It shall be appreciated that the present disclosure does not limit the number of cameras and video. Those of ordinary skill in the art shall appreciate the implementations with different numbers of cameras and video (i.e., greater than 2) based on the above descriptions. Therefore, the details will not be repeated herein.

In some embodiments, the panoramic video conference system 1 may further comprise a cloud server. The panoramic video conference system 1 may transmit the conference data (e.g., the panoramic conference video and the related information) to the cloud server, and store the conference data in the cloud server as the historical conference records for the relevant member of the conference to query.

According to the above descriptions, the panoramic video conference system 1 provided by the present disclosure identify a plurality of video objects in the panoramic video by analyzing the panoramic video. In addition, the panoramic video conference system 1 provided by the present disclosure can select a to-be-removed video object from the video objects to remove from the panoramic video based on a privacy mode. Finally, the panoramic video conference system 1 provided by the present disclosure generates a panoramic conference video based on the panoramic video and a background filling video. The panoramic video conference system 1 provided by the present disclosure can selectively hide some video objects through the above-mentioned mechanism, so as to provide enterprises with more flexible privacy requirements. In addition, the panoramic video conference system 1 provided by the present disclosure provides a plurality of functions, and improves the service and quality of the online conference.

Figure 4:
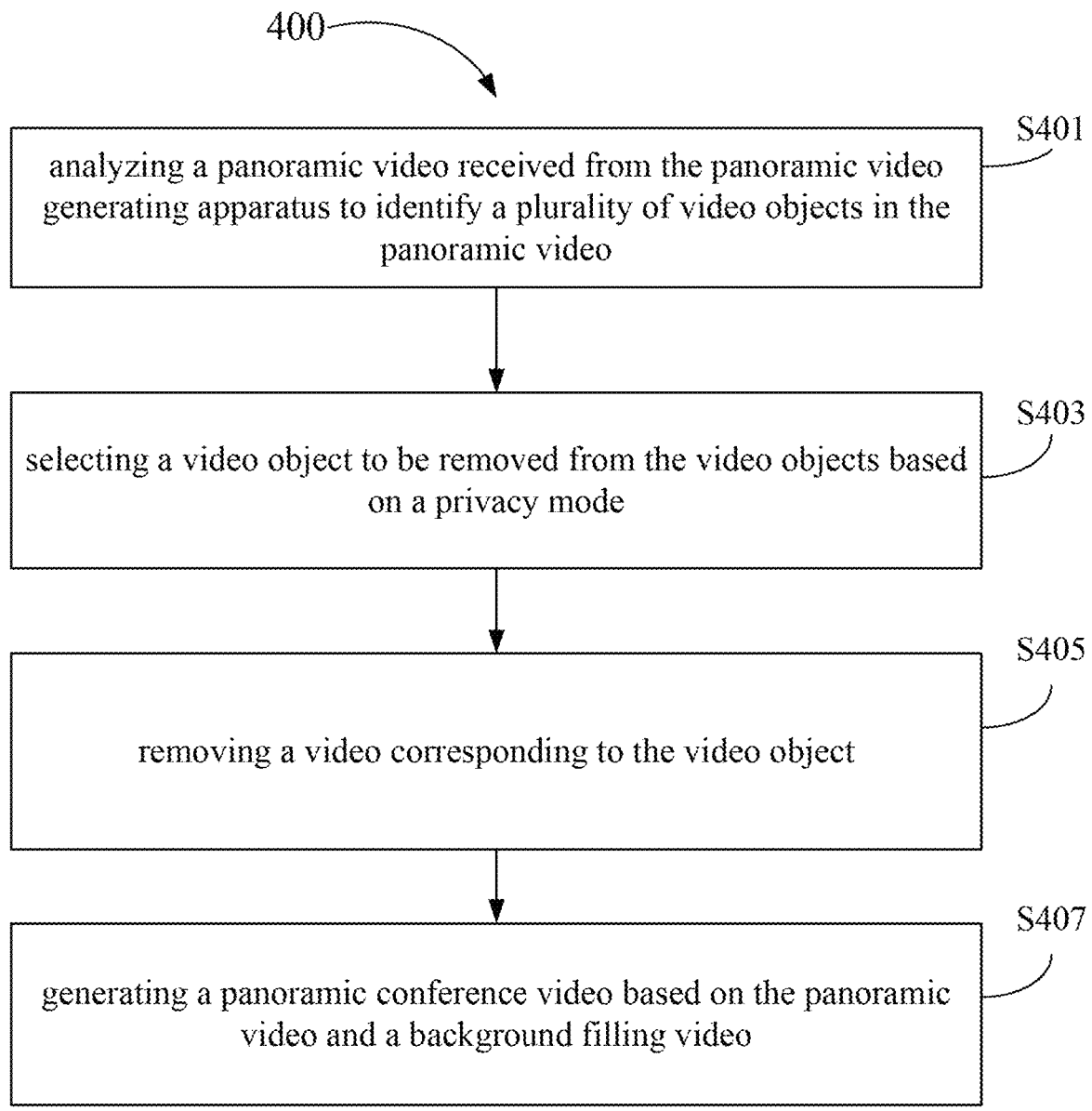
FIG. 4 is a partial flowchart depicting a panoramic video conference method of the second embodiment.

A second embodiment of the present disclosure is a panoramic video conference method and a flowchart thereof is depicted in FIG. 4. The panoramic video conference method 400 is adapted for use in a panoramic video conference system (e.g., the panoramic video conference system 1 of the first embodiment). The panoramic video conference system comprises a panoramic video generating apparatus and a control apparatus (e.g., the panoramic video generating apparatus 3 and the control apparatus 2 of the first embodiment). The panoramic video conference method 400 is performed by the control apparatus. The panoramic video conference method 400 generates a panoramic conference video through the steps S401 to S407.

In the step S401, the control apparatus analyzes a panoramic video received from the panoramic video generating apparatus to identify a plurality of video objects in the panoramic video. In the step S403, the control apparatus selects a video object to be removed from the video objects based on a privacy mode.

Next, in the step S405, the control apparatus removes a video corresponding to the video object. Finally, in the step S407, the control apparatus generates a panoramic conference video based on the panoramic video and a background filling video.

In some embodiments, the control apparatus further provides with an video identification model, and the panoramic video conference method 400 further comprises following steps: identifying the video objects in the panoramic video based on an edge detection algorithm and the video identification model, wherein the video identification model is implemented by a training process based on a plurality of object features and a plurality of conference member features.

In some embodiments, the the panoramic video conference system further comprises a microphone array (e.g., the microphone array 4 of the first embodiment). The microphone array is connected to the control apparatus through a network connection, and the microphone array is configured to sense a sound of a conference room to generate a sound signal. The panoramic video conference method 400 further comprises following steps: receiving the sound signal from the microphone array; determining a speech source based on the sound signal; comparing a plurality of conference member features with the panoramic video corresponding to the speech source to determine whether the panoramic video corresponding to the speech source has a first conference member feature that matches the conference member features; generating a focusing video corresponding to the speech source when it is determined that the panoramic video corresponding to the speech source has the first conference member feature; and generating the panoramic conference video based on the focusing video and the panoramic video.

In some embodiments, the panoramic video conference system further comprises a display (e.g., the display 5 of the first embodiment). The display 5 is configured to play a remote conference video and a remote conference sound. The panoramic video conference method 400 further comprises following steps: generating an exclusion area based on a position of the display; comparing the speech source with the exclusion area to determine whether the speech source comes from the exclusion area; and wherein the focusing video corresponding to the speech source is not generated when the speech source comes from the exclusion area.

In some embodiments, the the panoramic video conference system further comprises a first camera and a second camera. The first camera is configured to generate a first video, the second camera is configured to generate a second video, and the panoramic video is composed of the first video and the second video.

In some embodiments, the panoramic video conference method 400 further comprises following steps: detecting whether a first conference member with a first conference member feature appears in the first video; and generating a close-up video of the first conference member as the first video when the first conference member with the first conference member feature appears in the first video.

In some embodiments, the the panoramic video conference method 400 further comprises following steps: detecting whether a second conference member with a second conference member feature appears in the first video; and generating the close-up video of the second conference member as the second video when the second conference member with the second conference member feature appears in the second video.

In some embodiments, the the panoramic video conference method 400 further comprises following steps: calculating a plurality of color feature values of a plurality of adjacent blocks of the video object to be removed; and generating the background filling video based on the color feature values.

In addition to the aforesaid steps, the second embodiment can also execute all the operations and steps of the panoramic video conference system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the video, the conference member, the conference member feature, and the camera) are preceded by terms such as "first" or "second," and these terms of "first" and "second" are only used to distinguish these different words. For example, the "first" and "second" in the first video and the second video are only used to indicate the video used in different operations.

According to the above descriptions, the panoramic video conference technology (at least includes the system and the method) provided by the present disclosure identify a plurality of video objects in the panoramic video by analyzing the panoramic video. In addition, the panoramic video conference technology provided by the present disclosure can select a to-be-removed video object from the video objects to remove from the panoramic video based on a privacy mode. Finally, the panoramic video conference technology provided by the present disclosure generates a panoramic conference video based on the panoramic video and a background filling video. The panoramic video conference technology provided by the present disclosure can selectively hide some video objects through the above-mentioned mechanism, so as to provide enterprises with more flexible privacy requirements. In addition, the panoramic video conference technology provided by the present disclosure provides a plurality of functions, and improves the service and quality of the online conference.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A panoramic video conference system, comprising:
a panoramic video generating apparatus, comprising at least two cameras, being configured to generate a panoramic video;
a control apparatus, comprising a processor, being connected to the panoramic video generating apparatus, and being configured to perform following operations:
analyzing the panoramic video to identify a plurality of video objects in the panoramic video;
selecting a video object to be removed from the video objects based on a privacy mode;
removing a video corresponding to the video object to generate a blank area;
generating a background filling video according to a plurality of adjacent blocks of the video object being removed; and
filling the background filling video to the blank area to generate a panoramic conference video;
wherein the panoramic video conference system further comprises:
a microphone array, being connected to the control apparatus through a network connection, and being configured to sense a sound of a conference room to generate a sound signal; and
a display, being configured to play a remote conference video and a remote conference sound;
wherein the control apparatus further performs following operations:
receiving the sound signal from the microphone array;
determining a speech source based on the sound signal;
comparing a plurality of conference member features with the panoramic video corresponding to the speech source to determine whether the panoramic video corresponding to the speech source has a first conference member feature that matches the conference member features;
generating a focusing video corresponding to the speech source when it is determined that the panoramic video corresponding to the speech source has the first conference member feature;
generating the panoramic conference video based on the focusing video and the panoramic video;
generating an exclusion area based on a position of the display;
comparing the speech source with the exclusion area to determine whether the speech source comes from the exclusion area; and
wherein the focusing video corresponding to the speech source is not generated when the speech source comes from the exclusion area.

2. The panoramic video conference system of claim 1, wherein the control apparatus further provides with an video identification model, and the control apparatus further performs following operations:
identifying the video objects in the panoramic video based on an edge detection algorithm and the video identification model, wherein the video identification model is implemented by a training process based on a plurality of object features and a plurality of conference member features.

3. The panoramic video conference system of claim 1, wherein the panoramic video conference system further comprises:
a first camera and a second camera, wherein the first camera is configured to generate a first video, the second camera is configured to generate a second video, and the panoramic video is composed of the first video and the second video.

4. The panoramic video conference system of claim 3, wherein the control apparatus further performs following operations:
detecting whether a first conference member with a first conference member feature appears in the first video; and
generating a close-up video of the first conference member as the first video when the first conference member with the first conference member feature appears in the first video.

5. The panoramic video conference system of claim 4, wherein the control apparatus further performs following operations:
detecting whether a second conference member with a second conference member feature appears in the first video; and
generating the close-up video of the second conference member as the second video when the second conference member with the second conference member feature appears in the second video.

6. The panoramic video conference system of claim 1, wherein the control apparatus further performs following operations:
calculating a plurality of color feature values of the adjacent blocks of the video object to be removed; and
generating the background filling video based on the color feature values.

7. The panoramic video conference system of claim 1, wherein the panoramic conference video comprises an upper divided video and a lower divided video, the upper divided video is the panoramic video, and the lower divided video is the focusing video.

8. The panoramic video conference system of claim 1, wherein the control apparatus determines the speech source through a direction of arrival algorithm and a beamforming algorithm.

9. A panoramic video conference method, being adapted for use in a panoramic video conference system, the panoramic video conference system comprising a panoramic video generating apparatus and a control apparatus, and the panoramic video conference method is performed by the control apparatus and comprises following steps:

analyzing a panoramic video received from the panoramic video generating apparatus to identify a plurality of video objects in the panoramic video;

selecting a video object to be removed from the video objects based on a privacy mode;

removing a video corresponding to the video object to generate a blank area;

generating a background filling video according to a plurality of adjacent blocks of the video object being removed; and filling the background filling video to the blank area to generate a panoramic conference video;

wherein the panoramic video conference system further comprises:

a microphone array, being connected to the control apparatus through a network connection, and being configured to sense a sound of a conference room to generate a sound signal; and a display, being configured to play a remote conference video and a remote conference sound;

wherein the panoramic video conference method further comprises following steps:

receiving the sound signal from the microphone array;

determining a speech source based on the sound signal;

comparing a plurality of conference member features with the panoramic video corresponding to the speech source to determine whether the panoramic video corresponding to the speech source has a first conference member feature that matches the conference member features;

generating a focusing video corresponding to the speech source when it is determined that the panoramic video corresponding to the speech source has the first conference member feature;

generating the panoramic conference video based on the focusing video and the panoramic video;

generating an exclusion area based on a position of the display;

comparing the speech source with the exclusion area to determine whether the speech source comes from the exclusion area; and wherein the focusing video corresponding to the speech source is not generated when the speech source comes from the exclusion area.

10. The panoramic video conference method of claim 9, wherein the control apparatus further provides with an video identification model, and the panoramic video conference method further comprises following steps:

identifying the video objects in the panoramic video based on an edge detection algorithm and the video identification model, wherein the video identification model is implemented by a training process based on a plurality of object features and a plurality of conference member features.

11. The panoramic video conference method of claim 9, wherein the panoramic video conference system further comprises:

a first camera and a second camera, wherein the first camera is configured to generate a first video, the second camera is configured to generate a second video, and the panoramic video is composed of the first video and the second video.

12. The panoramic video conference method of claim 11, wherein the panoramic video conference method further comprises following steps:

detecting whether a first conference member with a first conference member feature appears in the first video; and generating a close-up video of the first conference member as the first video when the first conference member with the first conference member feature appears in the first video.

13. The panoramic video conference method of claim 12, wherein the panoramic video conference method further comprises following steps:

detecting whether a second conference member with a second conference member feature appears in the first video; and generating the close-up video of the second conference member as the second video when the second conference member with the second conference member feature appears in the second video.

14. The panoramic video conference method of claim 9, wherein the panoramic video conference method further comprises following steps:

calculating a plurality of color feature values of the adjacent blocks of the video object to be removed; and generating the background filling video based on the color feature values.

15. The panoramic video conference method of claim 9, wherein the panoramic conference video comprises an upper divided video and a lower divided video, the upper divided video is the panoramic video, and the lower divided video is the focusing video.

16. The panoramic video conference method of claim 9, wherein the step of determining the speech source is performed through a direction of arrival algorithm and a beamforming algorithm.

* * * * *